July 17, 1934.   G. P. GOODE   1,966,547
IRRADIATION APPARATUS
Filed Jan. 21, 1932   6 Sheets-Sheet 1
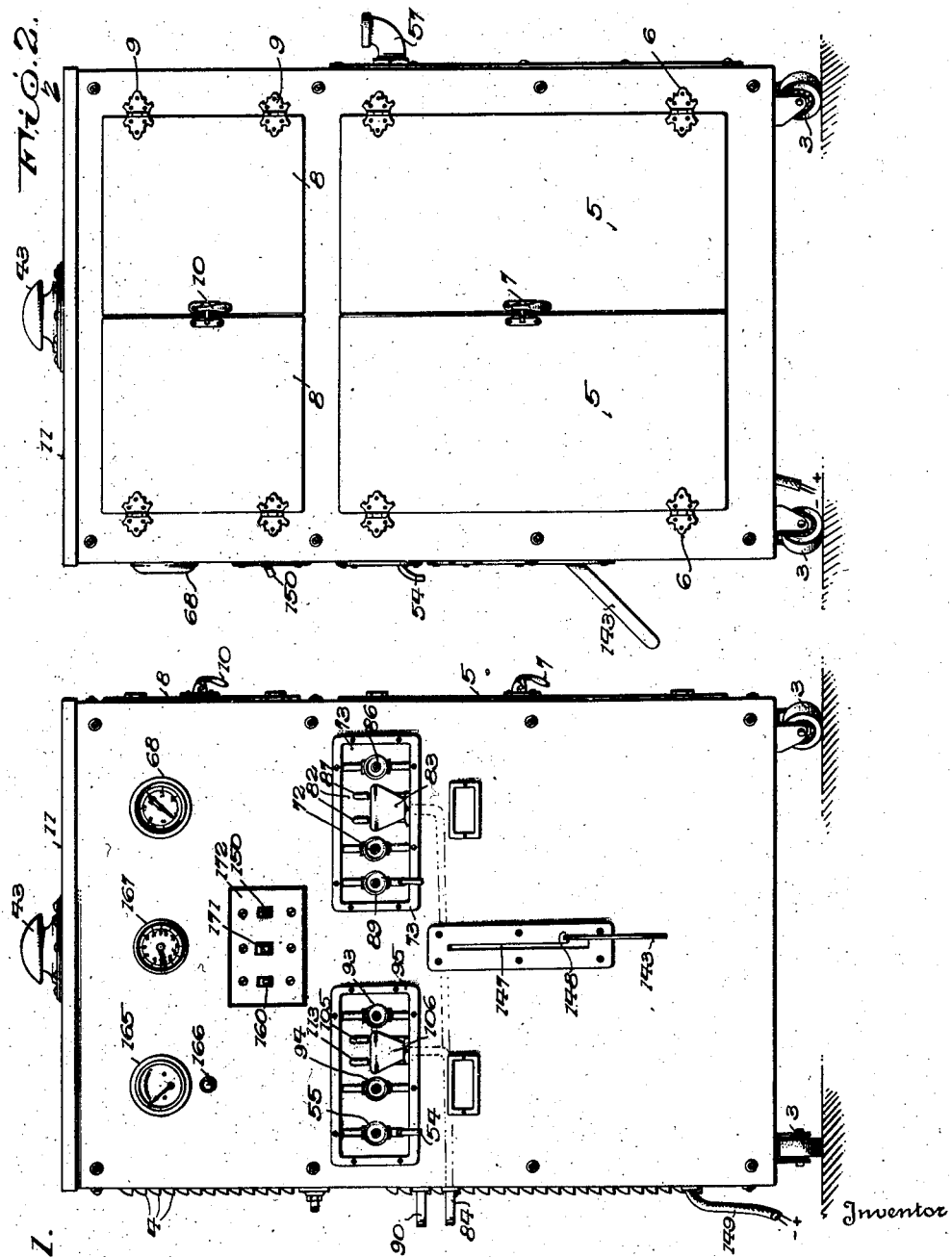
Inventor
Godfrey P. Goode.
By Cameron, Kerkam & Sutton
Attorneys

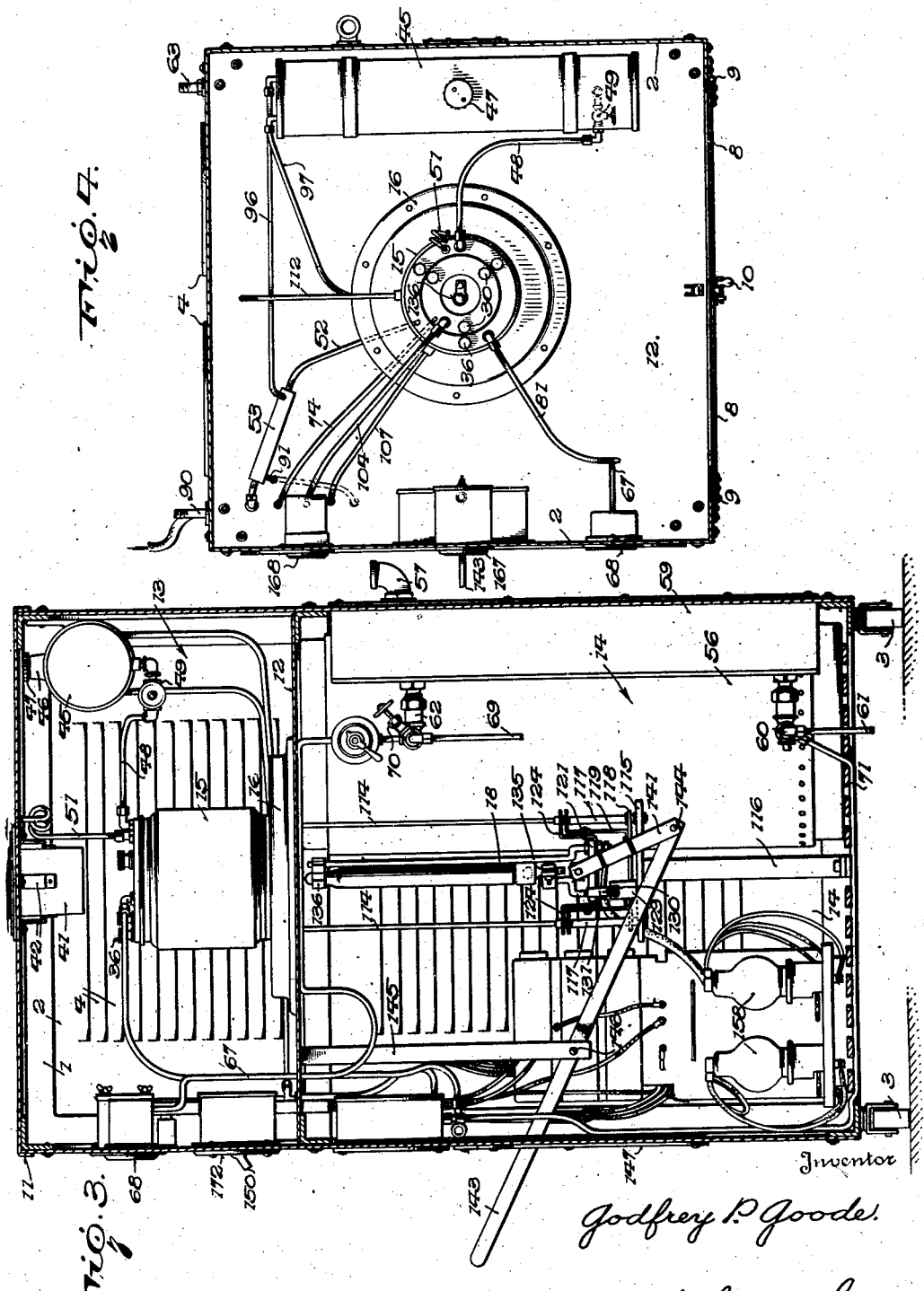

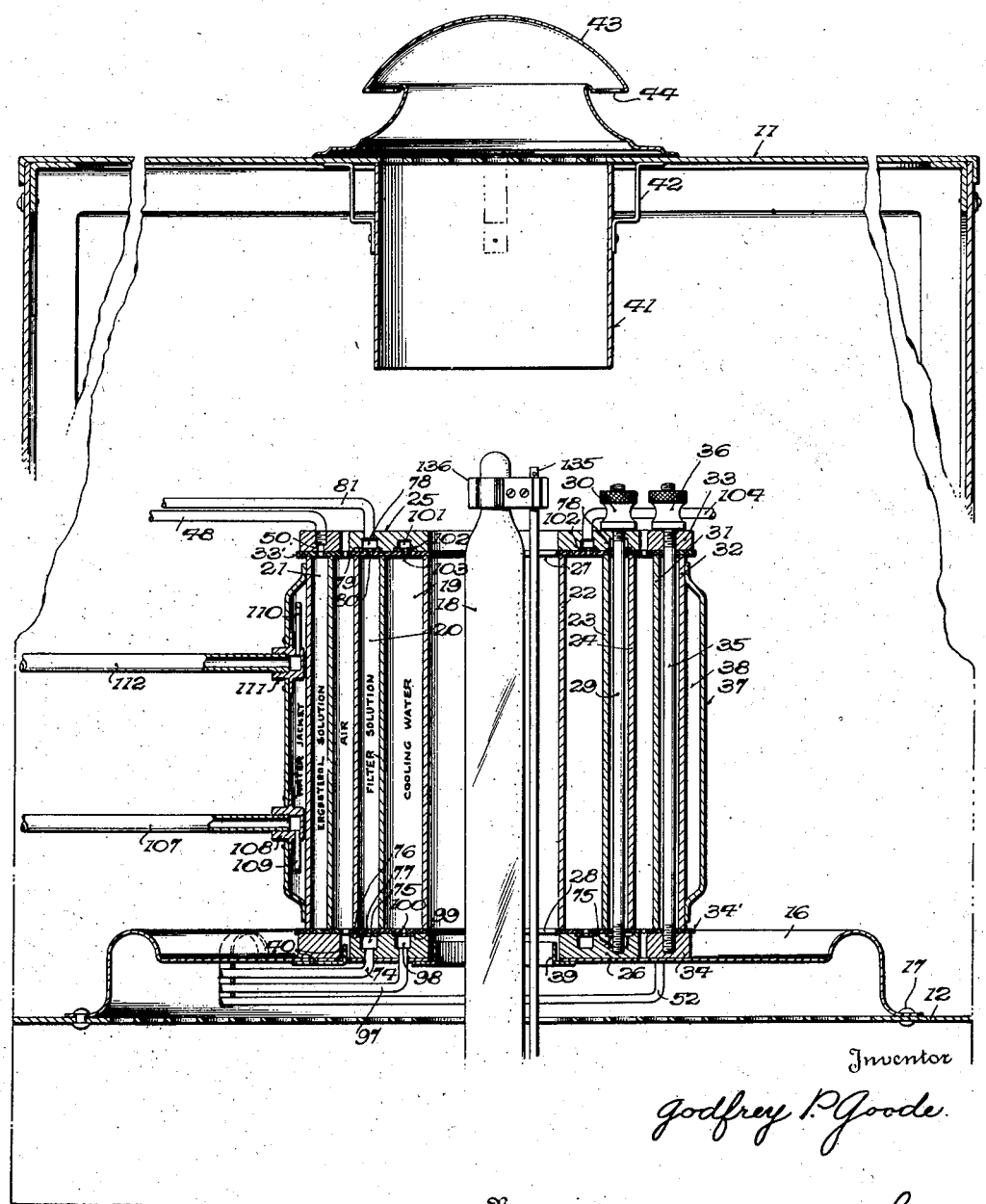

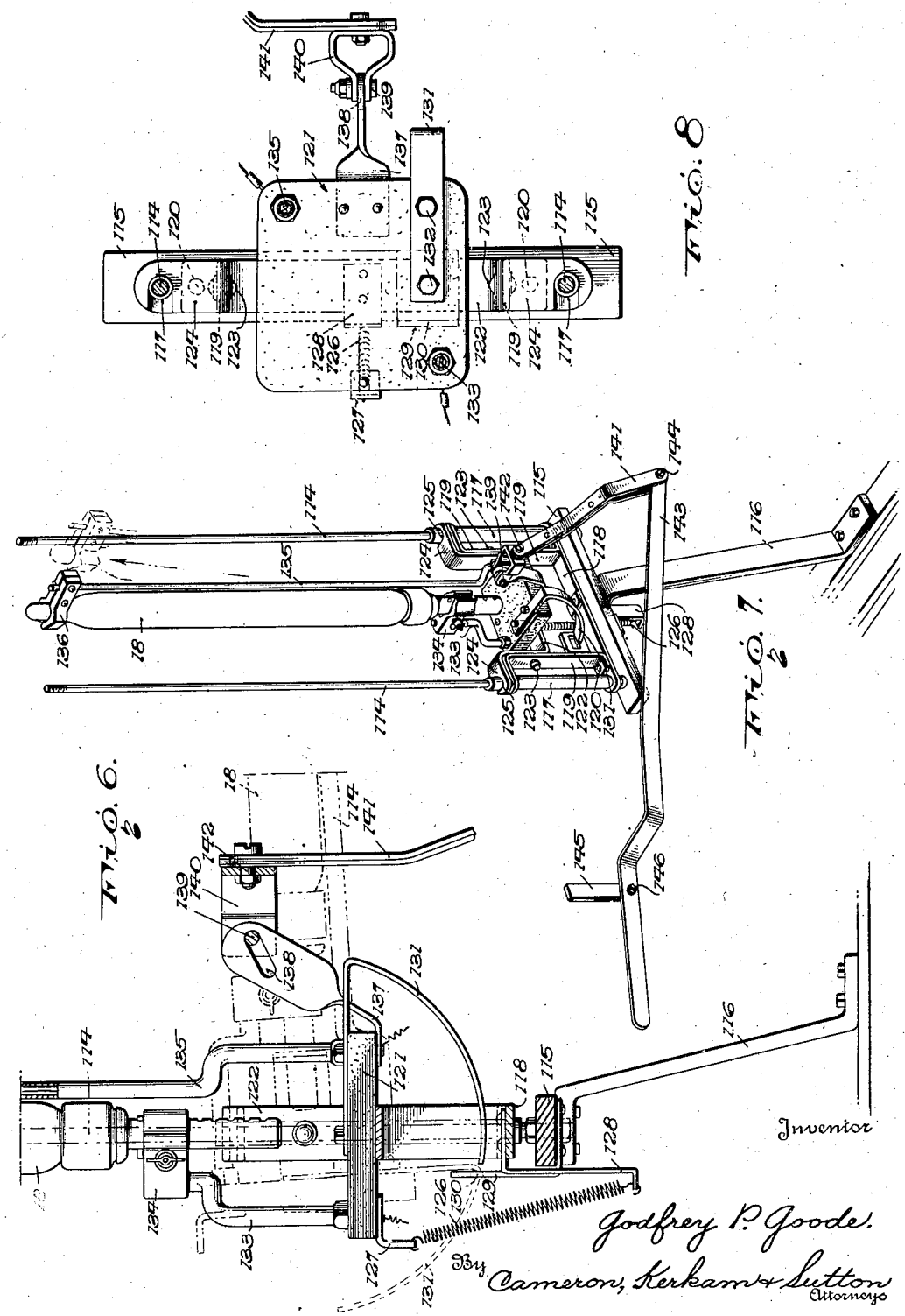

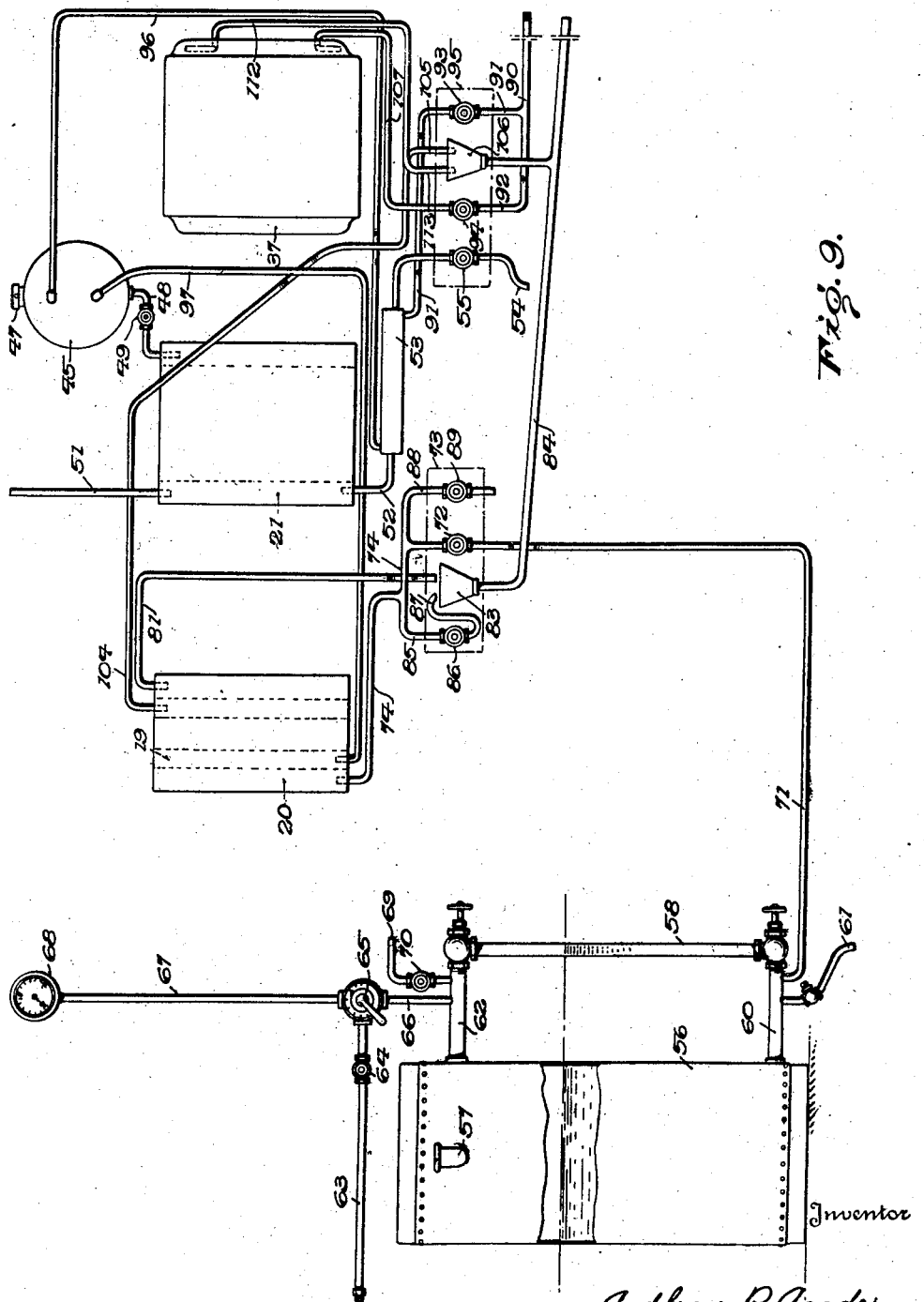

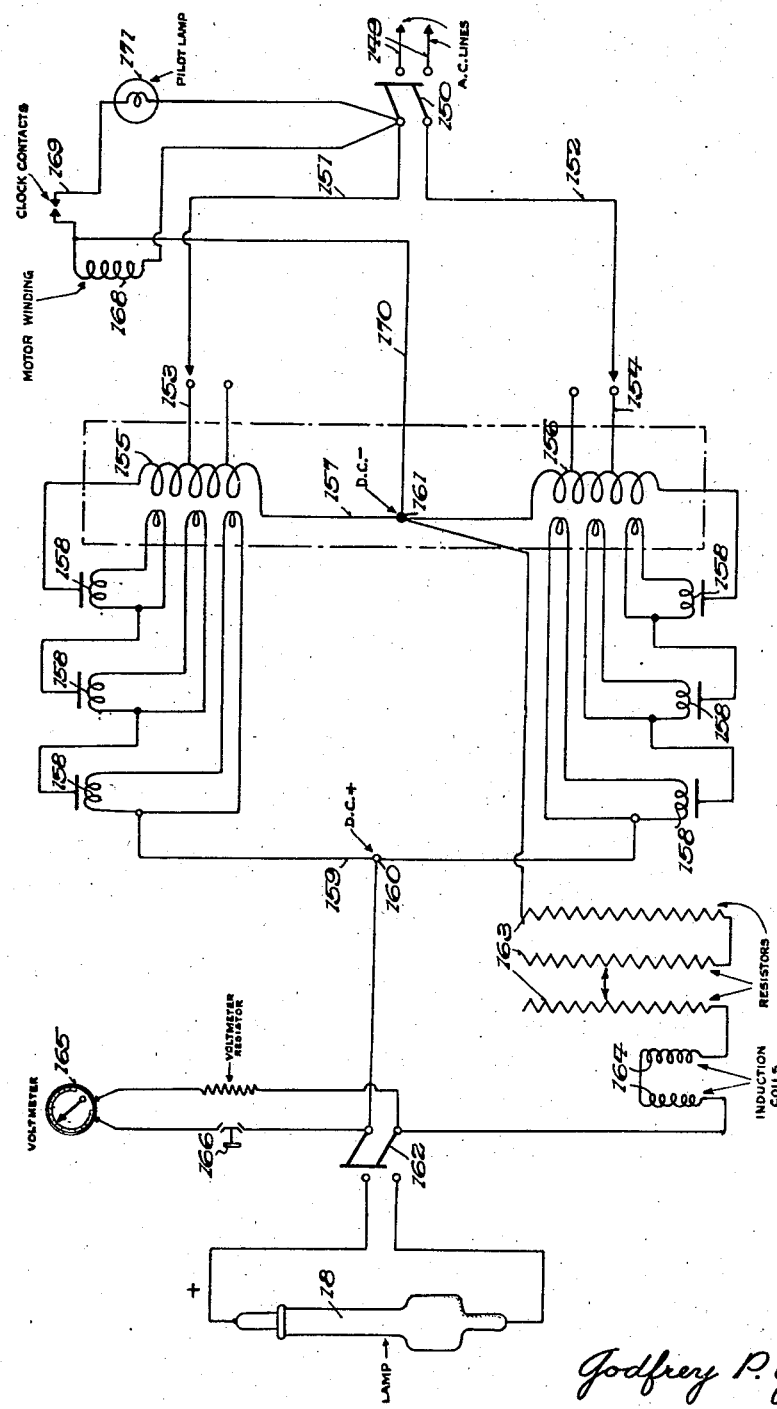

Patented July 17, 1934

1,966,547

UNITED STATES PATENT OFFICE 1,966,547

IRRADIATION APPARATUS

Godfrey P. Goode, Covington, Ky., assignor to General Development Laboratories, Inc., New York, N. Y., a corporation of Delaware Application January 21, 1932, Serial No. 588,017

9 Claims. (Cl. 99—2)

This invention relates to apparatus for the irradiation of liquids, liquid solutions, etc., and more particularly to irradiation of the same with ultra-violet light through a liquid filtering medium.

For purposes of illustration, the invention is hereinafter described in connection with the irradiation of solutions of ergosterol for the purpose of creating antirachitic properties in such solutions, although the apparatus is not limited to this particular use. It is known that when ergosterol is irradiated with ultra-violet light, certain photochemical changes take place therein which endow the changed ergosterol with antirachitic properties. It is also known that different reactions are caused by different wave lengths in the ultra-violet region of the spectrum. When ergosterol is irradiated with the full spectrum from a source such as the mercury arc, the antirachitic potency of the resulting product increases as the period of irradiation is prolonged until a maximum potency is reached, the length of this period depending upon the intensity of the irradiation, but further irradiation results in decreasing or destroying the antirachitic potency. On the other hand, when ergosterol is irradiated with ultra-violet light containing no wave lengths shorter than about 2900 Angstrom units, these destructive effects do not occur and the irradiation may be carried out for longer periods and greater potencies can be obtained than in the case of irradiation with ultra-violet light containing shorter wave lengths.

While it is possible to provide sources of ultra-violet radiation which do not radiate the objectionable short waves, most convenient sources of ultra-violet radiation such as the mercury arc emit strongly in the objectionable short wave length region. Hence it is necessary to filter the radiation from a mercury arc and analogous sources in order to obtain best results and the most convenient type of filter is a liquid solution of some substance such as copper sulfate or lead acetate, the particular substance used and the concentration of the solution depending upon the desired short wave length limit of transmission of the filter. Such filters, however, are subject to decomposition by heat and by photo-chemical reactions caused by the ultra-violet light and moreover the filter cells tend to become contaminated by deposits of the dissolved material so that careful control of the filter solution is required in order to obtain accurate control of the wave lengths transmitted. Slight traces of impurities in the filter solution and relatively slight variations in its concentration such as might readily be caused by deposits of the dissolved material in the filter cell will cause marked changes in the transmission characteristics of the solution. The ergosterol is also preferably irradiated in solution in a suitable solvent such as alcohol or ether, because it is easy to handle in such a form and because air is substantially excluded. It is necessary, however, that the entire volume of the solution be subjected to the radiation, the solution preferably being spread out in a relatively thin film, and the temperature of the solution must also be regulated within limits. For these reasons the irradiation of ergosterol solutions has heretofore been a highly technical laboratory procedure, carried out only by skilled laboratory technicians. The same difficulties are encountered in the irradiation of many other substances.

One of the objects of the present invention is to provide a novel apparatus whereby an ergosterol solution or the like can be irradiated with accurate control of the various factors mentioned above and in large quantities with standardized results.

Another object is to provide a novel apparatus embodying novel means for handling the ergosterol and filtering solutions and suitable cooling media independently during the period of irradiation.

Another object is to provide novel irradiation apparatus embodying means for irradiating the solution through a filter solution and so arranged that practically the total radiation from the radiation source is usefully employed.

A further object is to provide irradiation apparatus embodying a mercury arc lamp together with novel means for controlling the lamp whereby it may be tilted to start the arc and thereafter moved to its operating position.

Another object is to provide novel irradiation apparatus of the class described that is housed in a cabinet, the whole being constructed and arranged so as to provide an efficient circulation of air through the apparatus for conducting away the heat generated therein.

A still further object is to provide a novel irradiation apparatus that is substantially completely enclosed during operation and which embodies in a single movable unit all necessary equipment to render the same substantially self-operative, means being provided for the circulation of cooling media in the apparatus to maintain correct and even temperatures and externally visible means being provided whereby the operation of the apparatus at the important points can be checked.

One embodiment of the invention is illustrated in the accompanying drawings, but it is to be expressly understood that said drawings are for purposes of illustration only and are not to be construed as a definition of the limits of the invention, reference being had to the appended claims for this purpose.

In said drawings,

Figs. 1 and 2 are views of different sides of an apparatus embodying the invention;

Fig. 3 is a side view of the apparatus with the casing removed;

Fig. 4 is a plan view of the apparatus with the cover removed;

Fig. 5 is a sectional view of a portion of the apparatus;

Figs. 6, 7 and 8 are detail views of means for supporting and operating a mercury arc lamp;

Fig. 9 is a diagram showing the liquid circulation; and

Fig. 10 is a wiring diagram of suitable electrical connections for the apparatus.

The apparatus is mounted and enclosed in a cabinet of any suitable size, shape and construction. In the form shown, the cabinet comprises a frame of angle irons 1, to which are secured side panels 2, the whole being preferably mounted on rollers 3. One of the side panels preferably comprises a plurality of louvers 4 and another side panel includes lower doors 5 hinged to the cabinet at 6 and provided with a latch 7 and upper doors 8 hinged to the cabinet at 9 and provided with a suitable latch 10. A suitable cover 11 is provided for the top of the cabinet, said cover preferably being removable. As shown in Fig. 3, a shelf 12 divides the cabinet into an upper compartment 13 and a lower compartment 14. Preferably the side panels, doors, cover etc., are of sheet metal, although any other suitable material may be employed.

The upper compartment 13 houses an irradiation unit indicated generally at 15 in Fig. 3, said unit being shown in section in Fig. 5. As seen in Fig. 5, the shelf 12 is open at its central portion and a supporting plate 16 is secured thereto in any suitable manner as by rivets 17. The irradiation unit 15 is mounted on the supporting plate 16 and comprises a plurality of concentric annular chambers which as shown are three in number, said chambers surrounding a suitable source of ultra-violet radiation such as a mercury arc lamp 18 mounted as described hereinafter. Immediately surrounding the lamp 18 is a chamber 19 through which cooling water is circulated, and surrounding said chamber 19 is a chamber 20 through which the filter solution is circulated. The outer chamber 21 contains the solution to be irradiated, so that the radiation from the lamp passes first through the cooling water, then through the filter solution, and then through the ergosterol solution. In this way all of the radiation from the lamp is both cooled and filtered before it reaches the ergosterol solution. Moreover, the use of concentric annular chambers surrounding a lamp which as shown comprises an arc extending the entire axial length of the chambers makes sure that the total radiation of the lamp is usefully employed.

The walls of the chambers 19, 20 and 21 are of material which transmits the desired ultra-violet radiation and since the chamber 20 contains a filter solution these walls need not have filtering characteristics but may be composed of material such as quartz glass which transmits ultra-violet light freely. The construction of the concentric chambers may vary and will depend to some extent upon the nature of the material comprising the cylinder walls and its characteristics such as its coefficient of expansion. In the form shown, the inner chambers 19 and 20 are constructed as one unit and the outer chamber 21 as a separate unit, an air space being left between the units. The inner unit comprises three cylindrical walls 22, 23 and 24 of quartz glass that are clamped between top and bottom annular members 25 and 26. Preferably the members 25 and 26 are of metal and gaskets 27 and 28 are interposed between said top and bottom members and the glass cylinders. Any suitable means may be provided for clamping the top and bottom members and cylinders together such as one or more rods 29 that are threaded into the bottom member 26 and extend through the top member 25, being provided with thumb nuts 30 on their upper ends. The outer chamber 21 comprises an inner cylindrical glass wall 31 and an outer wall 32 preferably of metal, said two walls being clamped between top and bottom annular members 33 and 34 and gaskets 33' and 34' in any suitable manner as by one or more rods 35 and nuts 36 corresponding to the rod 29 and nut 30. The outer metallic wall 32 may be provided with a jacket 37 providing a space 38 for the circulation of cooling medium. These units are mounted on the supporting plate 16 and are held centrally thereon in any suitable manner as by the central flange 39 fitting within the bottom member 26 and by one or more lugs 40 fitting within the bottom member 34.

The apparatus is preferably arranged to maintain a good circulation of air throughout, both in the lower compartment 14 and in the upper compartment 13 and also through the center of the irradiation unit 15 and around the lamp 18. Air enters both the upper compartment 13 and the lower compartment 14 through the louvers 4. The heat given off by electrical equipment in the lower compartment and by the lamp 18 creates an up draft in the cabinet which causes the air from the lower compartment to rise through the open central portion of the shelf 12 and to pass upwardly through the central space within the irradiation unit and around the lamp 18. Some of the air also passes between the bottom members 26 and 34 and through the air space between the walls 24 and 31. The air rising through the irradiation unit, together with the air entering the upper compartment, passes upwardly through a chimney 41 secured to the cover 11 in any suitable manner as by the brackets 42, the central portion of the cover within the chimney being perforated as clearly shown in Fig. 5. On the top of the cover is a hood 43 provided with exhaust or escape openings 44 for the hot air.

The ergosterol solution, or other solution to be irradiated, is contained in a tank 45 mounted in the upper compartment 13 as shown in Fig. 3 and provided with a filling tube 46 and screw cap 47. The ergosterol solution passes from tank 45 through a pipe 48 controlled by a valve 49 and through an opening 50 in the top of annular member 33 into the chamber 21. This chamber is filled with the ergosterol solution before the lamp is started, the air from the cylinder escaping through a vent pipe 51. After the irradiation is completed, the irradiated solution passes out from the bottom of the chamber 21 through a pipe 52 (Fig. 4) provided with a cooling jacket 53, and is drawn off outside the cabinet through a spout 54 (Fig. 1) controlled by a suitable valve 55. In view of the location of the tank 45, this circulation of the ergosterol solution takes place by gravity, although it will be understood that the tank may have any other suitable location and that the chamber 21 may be filled in any other way than by a gravity feed.

The filter solution for the chamber 20 is contained in a tank 56 in the lower compartment 14 of the cabinet, said tank being filled from the outside of the cabinet through a filling tube 57 and the level of the filter solution in said tank being indicated by a suitable liquid level gauge 58 visible from the outside of the cabinet and enclosed within a box 59. The tank 56 is connected with the gauge 58 at its bottom by a bottom gauge connection 60 which preferably includes a drain 61, and at its top by a top gauge connection 62 which is employed as a means for introducing air under pressure into the tank to circulate the filter solution up to the chamber 20. The air under pressure may be supplied from any suitable source to an air pipe 63 provided with a control valve 64 and a pressure regulating valve 65 from which the air is conducted through a pipe 66 to the gauge connection 62 and through a pipe 67 to a suitable pressure gauge 68 visible from the outside of the cabinet as shown in Fig. 1. For use in filling the tank 56, the gauge connection 62 is provided with an air vent pipe 69 and controlling valve 70.

The air pressure in the tank 56 is employed to effect a continuous circulation of the filter solution through the chamber 20, the solution being changed in said cylinder within a period such that no decomposition thereof takes place. The solution is moreover preferably circulated from the bottom of the cylinder to the top in order to prevent deposits, and is admitted to the bottom of the cylinder uniformly around the periphery thereof in order to establish a uniform flow. Preferably also means are provided that are visible from the outside of the cabinet whereby the circulation of the filter solution may be checked at any time. In the form shown, a feed pipe 71 leads from the bottom gauge connection 60 of the tank 56 to a control valve 72 in a box 73 that is mounted in one side of the cabinet so that the valve can be operated from the outside of the cabinet (Fig. 1). From the valve 72 a pipe 74 leads to an opening in the bottom member 26 which opening communicates with a channel or groove 75. A plate or ring 76 covers said channel 75 and is provided with a plurality of spaced openings 77 that are aligned with openings in the gasket 28, so that the filter solution passes through the channel 75 and is admitted to the chamber 20 at a plurality of points spaced uniformly around the same. A similar construction is preferably employed at the top of the chamber 20 where the top member 25 is provided with a channel 78 corresponding to the channel 75 and covered with a plate 79 provided with openings 80. From the channel 78 the filter solution is conducted by a pipe 81 to a discharge spout 82 discharging into a drain cup 83 and drain pipe 84, said cup 83 being mounted in the box 73 along with the valve 72 and being visible from the outside of the cabinet. It will be seen that the circulation of the filter solution through the chamber 20 can be checked by the discharge of solution from the spout 82 into the cup 83 adjacent the control valve 72. For the purpose of draining the chamber 20, pipe 74 is provided with a branch pipe 85 controlled by a valve 86 and terminating in a discharge spout 87 discharging into the drain cup 83. For the purpose of running water through the chamber 20, the pipe 74 is connected with a branch pipe 88 controlled by a valve 89 and adapted to be connected to a hose or other suitable source of circulating water. Preferably the valves 86 and 89 are placed in the box 73 together with the valve 72, so that the circulation of filter solution and the draining and flushing of the chamber 20 may be controlled from the outside of the cabinet, while the circulation may be checked from the outside of the cabinet by observing the discharge from the spout 82 into the cup 83.

Suitable means are provided for circulating cooling water through the apparatus, preferably from an external source of supply. Cooling water is conducted to the apparatus by means of a supply pipe 90 which as shown in Fig. 9 is provided with branches 91 and 92 having control valves 93 and 94 respectively. Preferably the control valves are mounted in a box 95 together with the valve 55 and are accessible from the outside of the cabinet. Pipe 91 leads to the cooling jacket 53 surrounding the pipe 52 through which the irradiated solution is discharged. From the jacket 53 a pipe 96 leads to a suitable cooling coil (not shown) in the tank 45 and the other end of the coil is connected to a pipe 97 which leads to a channel or groove 98 formed in the bottom member 26 as shown in Fig. 5. A ring or plate 99 covers said channel 98 and is provided with spaced openings 100 through which the cooling water is admitted to the chamber 19. Preferably a similar arrangement is provided at the top of the chamber including a channel 101, cover 102 and openings 103, said channel 101 being connected with a pipe 104 that is provided with a spout 105 discharging into a drain cup 106 mounted in the box 95 and connected with the drain 84. The circulation of cooling water through this branch of the cooling system can accordingly be controlled by the valve 93 and checked by the discharge from the spout 105.

Where it is desired to cool the outside of the chamber 21 and the cooling jacket 37 is provided as above described, the pipe 92 and valve 94 are connected by a pipe 107 with a union 108 in the wall of the jacket, said union being provided with an outlet 109 extending within the jacket space 38 as clearly shown in Fig. 5. The cooling water escapes from the jacket by means of a pipe 110 connected with a union 111 in the wall of the jacket, the water being conducted by a pipe 112 to a discharge spout 113 discharging into the drain cup 106. It will be seen that the radiation from the source 18 passes through the water in the chamber 19 before it reaches the filter solution and the ergosterol solution, this cooling water absorbing infra-red radiation, and also cooling water is circulated through the tank 45, around the chamber 21 and around the discharge pipe 52 in order to maintain the ergosterol solution at a suitable temperature. It will be understood that the particular arrangement of the cooling system shown in the drawings may be varied, both as to the points at which cooling is effected and also as to the arrangement of the circulating conduits and control valves.

As stated above, the source 18 preferably comprises a mercury arc lamp of any suitable type having an arc extending substantially the entire axial length of the chambers 19, 20 and 21. Arcs of this kind are usually started by tilting the lamp, but with an irradiation unit and lamp of the type described above it is not practicable to tilt the lamp when in operative position and accordingly means are provided for moving the lamp into and out of operative position and for tilting the lamp when in inoperative position. Preferably the lamp is both tilted and moved into operative position by a single operating member, a mechanism of this type being illustrated in detail in Figs. 6 to 8 inclusive. A suitable framework is provided on which the lamp support is mounted for movement, said framework comprising as shown in Fig. 7 a pair of guiding rods 114 preferably secured to and depending from the shelf 12 of the cabinet. The rods 114 are connected together at their lower ends by means of a bar 115 that is supported from the bottom of the cabinet by means of a bracket 116 so that the rods 114, bar 115 and bracket 116 comprise a rigid framework.

The lamp supporting means are adapted for sliding movement on the guide rods 114 and for the purpose of tilting the lamp, the lamp base is pivoted or tiltably mounted on the sliding support. In the form shown, the support comprises sleeves 117 that are slidable on the guide rods 114, said sleeves being connected together to constitute a rigid supporting means in any suitable manner as by a bar 118 connecting the lower ends of said sleeves and brackets 119 connected to the upper ends of said sleeves and secured to the bar 118 at 120. The lamp base 121 may comprise a plate or block preferably of insulating material and tiltably mounted on the sliding support 117, 118, 119 in any suitable manner, and preferably means are provided whereby the base may be tilted in one direction only about its pivots, the base being held in normal position relative to the sliding support by suitable resilient means which yield to permit tilting of the lamp to start the arc. To these ends a U-shaped supporting bracket 122 is pivoted between the brackets 119 at 123, said bracket 122 being provided with extensions 124 that are notched at 125 to fit around the upper ends of the sleeves 117. The lamp base 121 is carried on the bracket 122 in any suitable manner and is capable of tilting movement therewith about the pivots 123 in a clockwise direction as seen in Figs. 6 and 7 but is incapable of tilting in a counterclockwise direction because of the engagement of the extensions 124 with the sleeves 117. Said base is normally held in the position shown in Figs. 6 and 7 by suitable resilient means such as a coil spring 126 secured at one end to a bracket 127 on the base 121 and at the other end to a bracket 128 on the bar 118. To guide the base during tilting, a bracket 129 is secured to the bar 115 and is provided with a slot 130 through which an arcuate arm 131 is adapted to pass when the lamp is tilted, said arm being secured to the base 121 in any suitable manner as by screws or bolts 132. When the lamp base is in normal position as shown in Fig. 6, the arm 131 does not engage in the slot 130 and accordingly does not interfere with elevation of the lamp to operative position.

The lamp 18 is mounted on the base 121 in any suitable manner. As shown, a supporting rod 133 is secured to one corner of the base and is provided with a suitable clamp 134 supporting the lower end of the lamp 18. A rod 135 secured to the opposite corner of the base 121 is similarly provided with a clamp 136 supporting the upper end of the lamp 18. If desired the rods 133 and 135 may be hollow and may constitute conduits for the electrical connections to the lamp.

For the purpose of operating the lamp support and base, a bracket 137 (Fig. 6) is secured to said base 121 and is provided with a slot 138 in which is slidably engaged a pin 139 carried between the ends of a yoke 140. An operating link 141 is pivotally secured at one end to the yoke 140 by means of a bolt 142 and is pivotally connected at the other end to the end of an operating lever 143 by means of a bolt 144. The operating lever 143 is pivoted in the cabinet in any suitable manner and as shown in Fig. 3 a bracket 145 depends from the shelf 12 of the cabinet and the lever 143 is pivoted to said bracket at 146, the end of the lever extending through a slot 147 in the side of the cabinet as shown in Fig. 1. Fig. 3 shows the lamp and its supporting means in their normal inoperative position. When it is desired to start the operation of the lamp, the end of the lever 143 is raised and the link 141 pulls down on the bracket 137, tilting the base 121 and lamp 18 about the pivots 123 and against the tension of the spring 126. Tilting the lamp causes the mercury therein to flow toward the upper end thereof and to complete a circuit through the lamp, and when the lamp is moved back to normal position, an arc strikes in the lamp in accordance with the usual operation of such devices. The parts are now again in the position shown in Fig. 3 and the end of the lever 143 is now depressed in order to elevate the lamp into operative position. The movement of the lever is transmitted to the bracket 137 through the link 141, and since the base 121 cannot tilt in the reverse direction the base and support are slid upwardly on the rods 114, the lamp being locked in operative position in any suitable manner as by means of a notch 148 formed in the wall of the slot 147 in which the lever 143 can be engaged as shown in Fig. 1.

The apparatus can be operated either on direct or alternating current, but where the lamp 18 is of a type which operates on direct current it is necessary to rectify in case a source of alternating current is used. Fig. 10 illustrates a suitable arrangement whereby the apparatus can be operated from a source of alternating current indicated by the supply lines 149. A main switch 150 which is preferably on the outside of the cabinet as shown in Fig. 1 connects the lines 149 with the apparatus. In the form shown, the rectifying unit comprises a plurality of rectifying tubes of any suitable type. The leads 151 and 152 from the switch 150 are connected respectively to taps 153 and 154 of transformer coils 155 and 156, said coils being connected together at their adjacent ends by a wire 157. The outer ends of the coils 155 and 156 are connected to the positive electrodes of the rectifier tubes 158 which may be arranged in any suitable or known manner. For example, three tubes may be employed for each half cycle of the current, the end tubes being connected together by a wire 159. According to the known operation of such devices, the center tap 160 of the wire 159 and the center tap 161 of the wire 157 constitute respectively the positive and negative terminals of a source of direct current. The positive terminal 160 is connected directly to one pole of a lamp switch 162 which as shown in Fig. 1 is mounted on the outside of the cabinet. The negative terminal 161 is connected to the other pole of the switch 162, suitable resistors 163 and induction coils 164 being inserted in the negative lead to the switch. Preferably a volt meter 165 is connected across the switch 162, the volt meter circuit including a push button switch 166 and the volt meter and push button switch being mounted on the outside of the cabinet as shown in Fig. 1.

In order that the period of irradiation of the solution may be checked, it is preferable to provide a clock or hour meter which may be operated electrically if desired and is preferably mounted on the outside of the cabinet as shown at 167 in Fig. 1. This clock may be of any suitable type and may be operated in any suitable manner. As shown, one pole of the switch 150 is connected to the motor winding 168 of the clock and also to the clock contacts 169, the circuit being completed by a wire 170 leading to the terminal 161. It will be seen that the clock is always in operation when the switch 150 is closed, regardless of whether the lamp 18 is operating or not. Hence the clock circuit may be used to energize a pilot lamp 171 which can be seen from the outside of the cabinet as shown in Fig. 1, the switches 150 and 160 and the pilot lamp 171 being mounted on a control panel 172.

The operation of the apparatus will be clear from the foregoing description. The tank 45 is supplied with the solution to be irradiated and the solution in this tank is maintained at a substantially constant temperature by means of the cooling coil therein. The tank 56 is supplied with a desired filter solution which may as above stated comprise a solution of lead acetate, copper sulfate, etc., the concentration of the solution depending on the wave lengths which it is desired to transmit. When it is desired to use the apparatus, the switch 150 is closed and the pilot lamp 171 lights up, showing that current is being supplied to the apparatus. The valve 49 is opened to fill the outer chamber 21 with the solution to be irradiated, the air from the chamber escaping through the vent pipe 51. As soon as the chamber is filled, the valve may be closed. Air under pressure being supplied to the apparatus through the pipe 63, the filter solution from the tank 56 is forced through the pipe 71 and valve 72 into the filter chamber 20 and out of the filter chamber through the pipe 81 to the spout 82 and drain cup 83. The operator who opens the valve 72 checks the circulation of the filter solution by observing the discharge from the adjacent spout 82. The valves 93 and 94 are opened, supplying cooling water to the jacket 38 and to the tank 45 and cooling chamber 19, the operator checking the circulation of the cooling water by observing the discharge from the spouts 105 and 113.

The apparatus is now ready for use. The operating lever 143 is first lifted and the switch 162 is closed to tilt the lamp 18 and to start the arc therein. The lever 143 is then depressed to elevate the lamp to operative position, the lever being latched in the notch 148. The radiation from the lamp is now filtered first through the cooling water in the chamber 19 and then through the filter solution in the chamber 20 so that only the desired radiations reach the ergosterol solution in the chamber 21. This operation can be continued as long as desired, the operator periodically checking the operating conditions such as circulation of the filter solution and the cooling water, the lamp voltage, etc. When the irradiation is completed, the valve 55 is opened and the irradiated solution is drawn off through the spout 54. The chamber 21 may now be refilled with the solution, or the operation of the apparatus may be stopped.

It will be seen that the apparatus is entirely self-contained and is substantially self-operative requiring little or no attention except periodic checking of the operating conditions. Overheating is prevented throughout the apparatus by the circulation of the cooling water and also by reason of the circulation of air throughout the cabinet as described above. Thus the filter solution is maintained at a desired temperature and is changed in volume often enough so that it is not subject to decomposition either by heat or by photochemical action. The even and uniform flow of the filter solution through the chamber 20 insures a uniform condition of the filter solution throughout the chamber and tends to prevent deposits of the dissolved material or of foreign material which would tend to be formed in the case of pockets or eddies, and the same is true of the flow of water through the chamber 19. The standardization of operating conditions makes it possible to repeat a desired irradiation procedure with substantially standardized results and without the high degree of care and attention to details heretofore required.

It will be understood that the invention is not limited to the form described and illustrated in the drawings but is capable of a variety of physical expressions, and also that various changes may be made in the form, details of construction and arrangement of the parts without departing from the spirit of the invention. Reference is therefore to be had to the appended claims for a definition of the limits of the invention.

What is claimed is:

1. Apparatus of the class described comprising, in combination with an annular chamber containing a substance to be irradiated, an ultra-violet arc lamp, a lamp support tiltable and movable vertically beneath said chamber, an operating member having an intermediate position when said support is in its lowermost position, and connections between said operating member and support whereby actuation of said member in one direction from its intermediate position tilts said support to start the arc and actuation of said member in the opposite direction elevates said support to move the lamp into the space surrounded by said chamber.

2. In apparatus of the class described, an ultra-violet arc lamp, a bodily movable and tiltable support for the lamp, means for tilting said support to start the arc in said lamp and for moving said support and lamp bodily to move the lamp to operative position, and yieldable means for continuously urging said support to untilted position.

3. In apparatus of the class described, an ultra-violet arc lamp, means for mounting the lamp comprising a vertically movable support and a lamp base pivoted thereon, and an operating member connected with said base whereby movement of said member in one direction elevates said mounting means and in the other direction tilts said base on said support.

4. In apparatus of the class described, the combination of a movable support, a base pivoted thereon, an ultra-violet arc lamp mounted on said base, whereby said base and lamp may be tilted relative to said support and said support, base and lamp may be moved bodily together, means preventing movement of said base about its pivots in one direction from normal position, and resilient means for maintaining said base in normal position relative to said support.

5. Irradiation apparatus comprising a cabinet, a shelf in said cabinet having an opening, cylinders of material transmitting ultra-violet light and forming an annular chamber mounted on said shelf about said opening, an ultra-violet lamp disposed in the space surrounded by said chamber, and a cover for said cabinet having a draft opening above said space, whereby a draft is established upwardly through said space and around said lamp.

6. Irradiation apparatus comprising a cabinet, a shelf dividing said cabinet into upper and lower compartments and having a centrally arranged opening, said cabinet having ventilating openings for both compartments, cylinders of material transmitting ultra-violet light and forming at least one annular chamber mounted on said shelf about said opening, an ultra-violet lamp disposed in the space surrounded by said annular chamber, a cover for said cabinet having a draft opening, a draft chimney depending from said cover in substantial alignment with said opening, and a ventilating hood on said cover.

7. Irradiation apparatus comprising a cabinet, cylinders of material transmitting ultra-violet light and forming a plurality of concentric annular chambers, an ultra-violet lamp disposed in the space surrounded by said chambers, a receptacle in said cabinet for a filter solution, means for circulating said filter solution through an inner chamber and including a discharge spout on the outside of said cabinet, a receptacle in said cabinet for liquids to be irradiated, and means for circulating said liquid through an outer chamber.

8. Irradiation apparatus comprising a cabinet, a plurality of cylinders therein forming concentric annular chambers, an ultra-violet lamp in the space surrounded by said chambers, a tank in said cabinet for a liquid to be irradiated and having a cooling coil therein, a water circulating system including the innermost chamber and said cooling coil, a tank in said cabinet for a liquid filter solution, means for circulating said solution through an intermediate chamber, a drain having drain cups on the outside of said cabinet, said water and solution circulating systems discharging into said drain cups, and means for circulating said liquid to be irradiated through an outer chamber.

9. Irradiation apparatus comprising a cabinet, a plurality of cylinders therein forming concentric annular chambers, an ultra-violet lamp in the space surrounded by said chambers, a tank in said cabinet for a liquid to be irradiated and having a cooling coil therein, a water circulating system including the innermost chamber and said cooling coil, a tank in said cabinet for a liquid filter solution, means for circulating said solution through an intermediate chamber, a drain having drain cups on the outside of said cabinet, means for circulating said liquid to be irradiated through an outer chamber and including a discharge pipe, and cooling jackets on said outer chamber and discharge pipe, said water circulating system including said jackets and said water and solution circulating systems discharging into said drain cups.

GODFREY P. GOODE.